US012764368B1

(12) United States Patent
Pansare et al.

(10) Patent No.: US 12,764,368 B1
(45) Date of Patent: Oct. 13, 2026

(54) VIDEO STREAM SYNCHRONIZATION BASED ON BREAK INDICATORS

(71) Applicant: Charter Communications Operating, LLC, St. Louis, MO (US)

(72) Inventors: Moin Ajaz Pansare, Aurora, CO (US); Sachin Reddy Kota, Indian Land, SC (US); David Chen, Aurora, CO (US); Vipul Patel, Parker, CO (US)

(73) Assignee: Charter Communications Operating, LLC, Raleigh, NC (US)

( * ) Notice: Subject to any disclaimer, the term of this patent is extended or adjusted under 35 U.S.C. 154(b) by 0 days.

(21) Appl. No.: 19/193,271

(22) Filed: Apr. 29, 2025

(51) Int. Cl.
*H04N 21/262* (2011.01)
*H04N 21/231* (2011.01)
*H04N 21/8547* (2011.01)

(52) U.S. Cl.
CPC ......... *H04N 21/262* (2013.01); *H04N 21/231* (2013.01); *H04N 21/8547* (2013.01)

(58) Field of Classification Search
CPC . H04N 21/262; H04N 21/231; H04N 21/8547
See application file for complete search history.

(56) References Cited

U.S. PATENT DOCUMENTS 10,693,642 B1 * 6/2020 Saxton .................... H04L 9/065
11,750,865 B1 * 9/2023 Mekuria ............... H04L 65/612 725/116
11,910,040 B2 * 2/2024 Pansare ................... H04L 65/61
2013/0064283 A1 * 3/2013 Sun .................. H04N 21/23439 375/E7.026
2016/0044078 A1 * 2/2016 Hosur ...................... H04L 67/02 709/219
2016/0323606 A1 * 11/2016 Mao ................. H04N 21/64707
2021/0089782 A1 * 3/2021 Weerasinghe ......... G06V 20/46

* cited by examiner

*Primary Examiner* — Yassin Alata
(74) *Attorney, Agent, or Firm* — Dority & Manning, P.A.

(57) ABSTRACT

A video stream packager accesses an encoded video stream that includes a plurality of encoded frames generated by an encoder from a source video stream, the encoded video stream including a plurality of original presentation timestamps that identify times that corresponding encoded frames of the plurality of encoded frames are to be presented on a display device. The video stream packager detects a break indicator signal that identifies a future time that the presentation of encoded frames from the encoded video stream is to be halted for a period of time. The video stream packager identifies an encoded frame that corresponds to the future time. The video stream packager stores the encoded frame and a predetermined value as a new presentation timestamp in place of the corresponding original presentation timestamp of the encoded frame in a segment file that has a name that includes the predetermined value.

20 Claims, 4 Drawing Sheets

VIDEO STREAM SYNCHRONIZATION BASED ON BREAK INDICATORS

BACKGROUND

A content provider may receive a source video stream from a source provider, such as a broadcast station, and generate a plurality of encoded output streams that are encoded differently, such as different compression mechanisms and/or different resolutions and bitrates.

SUMMARY

The examples disclosed herein implement video stream synchronization based on break indicators. The examples utilize break indicators, such as advertisement insertion indicators, that are in a source video stream to synchronize presentation timestamps across a plurality of pipelines.

In one implementation a method is provided. The method includes accessing, by a first video stream packager, a first encoded video stream comprising a first plurality of encoded frames in a first encoded format generated by a first encoder from a source video stream, the first encoded video stream comprising a plurality of original presentation timestamps that identify times that corresponding encoded frames of the first plurality of encoded frames are to be presented on a display device. The method further includes detecting, by the first video stream packager, a break indicator signal that identifies a future time that the presentation of encoded frames from the first encoded video stream is to be halted for a period of time. The method further includes identifying, by the first video stream packager, a first encoded frame that corresponds to the future time. The method further includes storing, by the first video stream packager, the first encoded frame and a predetermined value as a new presentation timestamp in place of the corresponding original presentation timestamp of the first encoded frame in a first segment file that has a name that includes the predetermined value.

In another implementation a computer system is provided. The computer system includes one or more computing devices operable to access, by a first video stream packager executing on one of the one or more computing devices, a first encoded video stream comprising a first plurality of encoded frames in a first encoded format generated by a first encoder from a source video stream, the first encoded video stream comprising a plurality of original presentation timestamps that identify times that corresponding encoded frames of the first plurality of encoded frames are to be presented on a display device. The one or more computing devices are further operable to detect, by the first video stream packager, a break indicator signal that identifies a future time that the presentation of encoded frames from the first encoded video stream is to be halted for a period of time. The one or more computing devices are further operable to identify, by the first video stream packager, a first encoded frame that corresponds to the future time. The one or more computing devices are further operable to store, by the first video stream packager, the first encoded frame and a predetermined value as a new presentation timestamp in place of the corresponding original presentation timestamp of the first encoded frame in a first segment file that has a name that includes the predetermined value.

In another implementation a non-transitory computer-readable storage medium is provided. The non-transitory computer-readable storage medium includes executable instructions operable to cause one or more computing devices to access, by a first video stream packager executing on one of the one or more computing devices, a first encoded video stream comprising a first plurality of encoded frames in a first encoded format generated by a first encoder from a source video stream, the first encoded video stream comprising a plurality of original presentation timestamps that identify times that corresponding encoded frames of the first plurality of encoded frames are to be presented on a display device. The instructions are further operable to cause one or more computing devices to detect, by the first video stream packager, a break indicator signal that identifies a future time that the presentation of encoded frames from the first encoded video stream is to be halted for a period of time. The instructions are further operable to cause one or more computing devices to identify, by the first video stream packager, a first encoded frame that corresponds to the future time. The instructions are further operable to cause one or more computing devices to store, by the first video stream packager, the first encoded frame and a predetermined value as a new presentation timestamp in place of the corresponding original presentation timestamp of the first encoded frame in a first segment file that has a name that includes the predetermined value.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
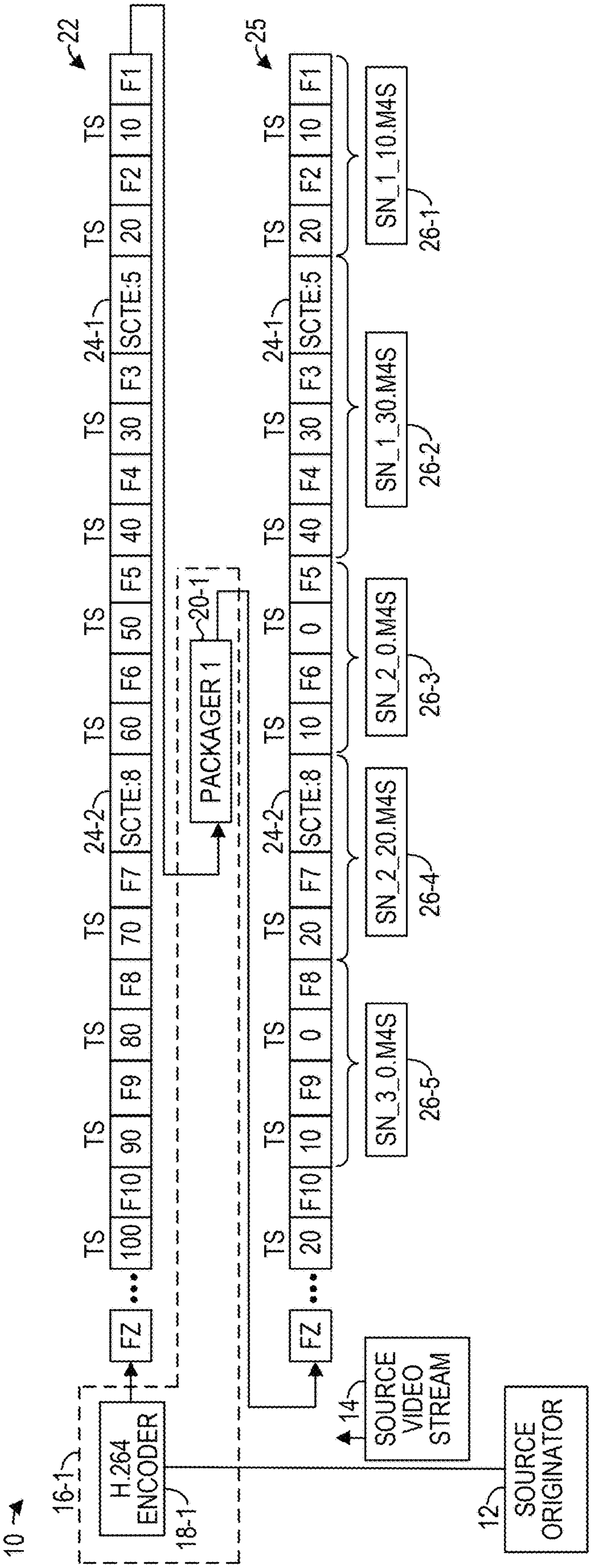
FIG. 1 is a block diagram of an environment suitable for video stream synchronization based on break indicators according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as “first message” and “second message,” and does not imply an initial occurrence, a quantity, a priority, a type, an importance, or other attribute, unless otherwise stated herein. The term “about” used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A content provider may receive a source video stream from a source provider, such as a broadcast station, and generate a plurality of encoded output streams that are encoded differently, such as different compression mechanisms and/or different resolutions and bitrates.

The encoded output streams are individually packaged into corresponding packaged assets using a format suitable for streaming, such as a MPEG-DASH (Dynamic Adaptive Streaming over HTTP format or the like. The combination of an encoder and a packager may be referred to herein as a pipeline, and a service provider may utilize a number of different pipelines to generate a plurality of packaged assets from the same source video stream to accommodate different device types, different service offerings, and the like.

A packaged asset typically comprises multiple segments, each of which contains a number of frames of the source video stream as encoded by the particular encoder. For example, a first packaged asset may comprise the source video encoded using H.264 encoding, and a second packaged asset may comprise the same source video encoded using H.265 encoding. Each segment has a unique name and it is common to name segments using a timing-based format, such as by including in the name of the segment the time that the initial frame contained in the segment should be presented for display on a display device.

A 90,000 time increments per second timescale is not uncommon for encoded frames. Thus, a timestamp that identifies when a frame is to be presented on a display device may identify a particular time with an accuracy to a $90{,}000^{th}$ of a second. Certain segment naming conventions use the presentation timestamp of an encoded frame in the segment as part of the filename.

Two different encoders that generate output streams of the same source video stream may attempt to synchronize with one another using a common timing source, such as network time protocol (NTP), to generate identical timestamps for the same segment. However, due to drift and delay and other factors such encoders, particularly when the encoders execute on different computing devices, may generate a presentation time stamp to a video frame having identical content that vary by a few 90,000ths of a second or more. For example, a first encoder may indicate that the frame is to be presented at 180,000 (i.e., two seconds), and the second encoder may indicate that the frame is to be presented at 180,005 (i.e., two seconds and $5/90000^{ths}$ of a second). The first encoder may generate a segment with a name that contains the value "180000" and the second encoder may generate a segment with a name that contains the value "180005" and thus the timestamp portion of the segment names differ from one another.

To stream a video a client device requests a streaming manifest file from a content delivery network (CDN). The manifest includes the segment names, usually URLs, generated by a particular pipeline. The manifest file may be delivered to the client device in chunks, such that successive chunks identify additional segments that contain frames that are to be imminently presented on the display device. The client device obtains the segments from the CDN using the segment names contained in the manifest file chunks. The client device then decodes the encoded frames contained in the segments, buffers the decoded frames and presents the decoded frames on the display device in accordance with presentation timestamps contained in the segments.

During playback, the packager (referred to herein as the "primary" packager to differentiate the primary packager from a backup packager) that is providing the manifest may fault or otherwise become inoperable due to any number of reasons, such as a computing system fault, a software bug, a network problem, or the like such that the primary packager can no longer provide additional manifest chunks to the client device. The CDN may detect the issue and automatically failover to a backup packager that is sourced from a different encoder than the primary packager. Consequently, the timestamps in the segment names may differ, as discussed above. The backup packager sends a manifest chunk to the client device but the segment names in the manifest chunk have different timestamps for segments with the same content as the primary packager. The client device receives segment names with unexpected timestamps. The client device's existing timeline/buffer built with the original manifest from the primary packager and the segment references/timing being used as anchors are no longer found in the backup manifest provided by the backup packager. The client device may have to entirely reset its buffer (e.g., a re-tune) and use the backup manifest's earliest available segment and other segment references to build a new timeline, causing a visible disruption to the user. In some situations, depending on how the failover is implemented, when the primary packager becomes available again, the client device may start receiving the manifest from primary packager and may have to perform another retune. Thus, when failing over, the client device cannot seamlessly transition from the primary packager's last segment to the backup packager's next segment, causing stalls or jumps.

The examples disclosed herein implement video stream synchronization based on break indicators. The examples utilize break indicators, such as advertisement insertion indicators, that are in a source video stream to synchronize presentation timestamps across a plurality of pipelines. Such break indicators may comprise, for example, Society of Cable Telecommunications Engineers (SCTE) 35 signals. The examples eliminate the need to utilize an external time source and communications between pipelines that are attempting to synchronize with one another. The examples ensure that each segment that is output by a particular pipeline that contains the same encoded frames identifies the same timestamp in the name of the segment. Because segments from different pipelines that contain the same encoded frames identify the same presentation timestamp, in a failover situation a client device will receive a backup manifest chunk from a backup packager that is in perfect synchronization with the previous manifest chunk that was received from the primary packager. The client device will not need to retune the buffer and thus no stall or visible disruption will occur to the viewer.

FIG. 1 is a block diagram of an environment 10 suitable for video stream synchronization based on break indicators according to some implementations. The environment 10 includes a source originator 12 that generates a source video stream 14. The source video stream 14 may comprise a video of a live event or be a video otherwise generated by the source originator 12. A pipeline 16-1 that includes an encoder 18-1 and a video stream packager 20-1 (hereinafter "packager 20-1" for the sake of brevity) processes the source video stream 14.

The encoder 18-1 encodes the source video stream 14 according to a particular encoded format, such as, by way of non-limiting example an H.264 encoded format, and in accordance with a desired resolution and/or bitrate. The encoder 18-1 generates an encoded video stream 22 of a plurality of encoded frames F1-FZ (generally, encoded frames F) at a desired frames per second (FPS) rate, such as 30 or 60 FPS. The encoder 18-1 may generate hundreds of thousands, or even millions of encoded frames depending on the duration of the source video stream 14.

The encoder 18-1 generates a presentation timestamp for at least some of the encoded frames F1-FZ that identify a relative point in time that the particular encoded frame F should be presented on a display device when being streamed to the display device. For purposes of illustration each of the encoded frames F in the encoded video stream 22 are illustrated with a corresponding presentation timestamp designated by the letter "TS". For example, the frame F1 has a corresponding presentation timestamp of 10, the frame F6 has a corresponding presentation timestamp of 60, and the frame F9 has a corresponding presentation timestamp of 90. Due to spatial limitations the presentation timestamps in FIG. 1 are illustrated as relatively small values, but in practice the units of the presentation timestamps may be in time increments of less than a second, such as, for example, 90,000 time increments per second, and thus may be much larger values than illustrated in FIG. 1.

The source video stream 14 includes one or more break indicator signals 24-1, 24-2 that identify future times that the presentation of encoded frames F are to be halted for a period of time. In some implementations the break indicator signals 24-1, 24-2 are SCTE 35 splice insert signals that identify when an advertisement is to be presented. The break indicator signals may identify a future point in time relative to the point in time of the encoded video stream 22 of the location of the break indicator signals 24-1, 24-2. For purposes of simplicity the break indicator signal 24-1 identifies the frame F4 as the location where the presentation should be halted and the break indicator signal 24-2 identifies the frame F8 as the location where the presentation should be halted, however, in practice, the break indicator signals 24-1, 24-2 may identify relative time offsets that resolve to frames F4 and F8, respectively. For example, the break indicator signal 24-1 may identify a presentation timestamp that corresponds to the frame F4.

The packager 20-1 accesses the encoded video stream 22 and generates a packaged encoded video stream 25 that comprises a plurality of segment files 26-1-26-5 (generally, segment files 26), each of which comprises one or more encoded frames F. For purposes of illustration and simplicity the segment files 26 are illustrated as having one or two frames F, however, in practice, segment files typically comprise 2-10 seconds of encoded frames and thus contain more than one or two encoded frames F. For example, if the encoder 18-1 is configured to generate two second segments and generates encoded frames F at 60 FPS, then the segment files may generally comprise approximately 120 encoded frames. However, some segments may have fewer than 120 encoded frames due, for example, a break indicator signal. In particular, it is preferable for a break, such as an advertisement, to occur on a segment boundary and thus, if the break indicator signal resolves to an encoded frame that would otherwise not be on a segment boundary, the packager 20-1 may adjust the size of a previous segment file to ensure that the encoded frame referred to by the break signal does begin on a segment boundary. Solely for purposes of illustration and simplicity it will be assumed that the packager 20-1 will generally generate segment files having two encoded frames F.

The packager 20-1 may initially process the encoded frame F1 and store the encoded frame F1 and the presentation timestamp 10 in the segment file 26-1. The packager 20-1 may process the encoded frame F2 and store the encoded frame F2 and the presentation timestamp 20 in the segment file 26-1. The presentation timestamps are relative timestamps and are relative to a reference point in time, which, as will be discussed below, can be reset during processing of the encoded video stream 22. The presentation timestamp 10 indicates that the encoded frame F1 should be presented on the display device of a streaming client 10 time increments after the most recent reference point in time, and the presentation timestamp 20 indicates that the encoded frame F2 should be presented on the display device of a streaming client 20 time increments after the most recent reference point in time.

The packager 20-1 gives the segment file 26-1 a name (e.g., "SN_1_10.M4S") that includes the timestamp value of the presentation timestamp of the first encoded frame in the segment file 26-1, in this example, the encoded frame F1 which has a presentation timestamp of 10. Since the segment file 26-1 contains two encoded frames, the packager 20-1 closes the segment file 26-1 and generates the new segment file 26-2. The packager 20-1 continues to process the encoded video stream 22 and identifies the break indicator signal 24-1. The packager 20-1 determines that the break indicator signal 24-1 indicates an advertisement break should occur immediately prior to frame F5, which thus identifies a future time that the presentation of the encoded frames F from the encoded video stream 22 is to be halted for a period of time. The packager 20-1 stores the break indicator signal 24-1 in the segment file 26-2. The packager 20-1 processes the encoded frame F3 and stores the encoded frame F3 and the timestamp 30 in the segment file 26-2. The timestamp 30 indicates that the encoded frame F3 should be presented on the display device of a streaming client 20 time increments after the most recent reference point in time. The packager 20-1 processes the encoded frame F4 and stores the encoded frame F4 and the timestamp 40 in the segment file 26-2. The packager 20-1 gives the segment file 26-2 a name (e.g., "SN_1_30.M4S") that includes the timestamp value of the presentation timestamp of the first encoded frame in the segment file 26-1, in this example, the encoded frame F3 which has a presentation timestamp of 30.

Since the segment file 26-2 contains two encoded frames, the packager 20-1 closes the segment file 26-2 and generates the new segment file 26-3. The packager 20-1 continues to process the encoded video stream 22 and processes the frame F5. The packager 20-1 stores the frame F5 in the segment file 26-3, but because the break indicator signal 24-1 indicated that an advertisement break should occur immediately prior to frame F5, the packager 20-1 changes the presentation timestamp of the frame F5 from the original presentation timestamp of 40 to a predetermined presentation timestamp value, in this example 0, and stores the presentation timestamp of 0 in the segment file 26-3. The packager 20-1 also stores information in the new segment file 26-3 indicating that the reference point in time, going forward, is the time of presentation of the frame F5. The packager 20-1 also stores the original presentation timestamp of 50 of the frame F5 in a memory location for subsequent use. The packager 20-1 processes the encoded frame F6 and stores the encoded frame F6 in the segment file 26-3. The packager 20-1 determines that a presentation time delta between the original presentation timestamp of 50 of the frame F5 and the original presentation timestamp of 60 of the frame F6 is 10 (e.g., 60-50). Thus, the frame F6 should be presented 10 time increments after the presentation of the frame F5. The packager 20-1 stores a presentation time of 10 for the frame F6 in the segment file 26-4. The packager 20-1 gives the segment file 26-3 a name (e.g., "SN_2_0.M4S") that includes the timestamp value of the presentation timestamp of the first encoded frame in the segment file 26-3, in this example, the encoded frame F5 which has a presentation timestamp of 0. The packager 20-1 may store the original presentation timestamp of each encoded frame F in memory for comparison to the original presentation of the next encoded frame F to determine the presentation time delta between each encoded frame F. Thus, the packager 20-1 stores the original presentation time 60 of the encoded frame F6 in a memory location.

Because identical presentation timestamp values may be included in the name of different segment files, the packager 20-1 ensures that segment file names are unique by ensuring the segment file names include other components. In this example, the packager 20-1 simply increments a counter each time the presentation timestamp is reset to zero, such that the name of the segment file 26-3 is "SN_2_0.M4S" so that the name differs from any previous or subsequent segment files wherein the presentation timestamp of the first encoded frame has been reset to a value of 0. In practice, to ensure unique segment file names, segment files may be named according to a template such as "$PeriodID_$RepresentationID_$PTS" wherein $PeriodID is a variable that refers to a particular period identifier of the encoded video stream, $RepresentationID is a variable that refers to a representation identifier of the encoded video stream, and $PTS is a variable that refers to a particular presentation timestamp of the first encoded frame in a segment file.

Since the segment file 26-3 contains two encoded frames, the packager 20-1 closes the segment file 26-3 and generates a new segment file 26-4. The packager 20-1 continues to process the encoded video stream 22 and identifies the break indicator signal 24-2. The packager 20-1 determines that the break indicator signal 24-2 indicates an advertisement break should occur immediately prior to frame F8, which thus identifies a future time that the presentation of the encoded frames F from the encoded video stream 22 is to be halted for a period of time. The packager 20-1 stores the break indicator signal 24-2 in the segment file 26-4. The packager 20-1 processes the encoded frame F7. The packager 20-1 accesses the original presentation timestamp of the previous frame F6 and accesses the original presentation timestamp of the frame F7 and determines that a presentation time delta between the original presentation timestamp of 60 of the frame F6 and the original presentation timestamp of 70 of the frame F7 is 10 in accordance with the formula:

presentation time delta=original presentation timestamp of current encoded frame−original presentation timestamp of previous encoded frame.

The packager 20-1 determines a new presentation timestamp of 20 for the frame F7 in accordance with the following formula:

new presentation timestamp=presentation timestamp of previous encoded frame (e.g., 10)+presentation time delta (e.g., 10).

Thus, the encoded frame F7 should be presented 10 time increments after the presentation of the frame F6. The packager 20-1 stores the encoded frame F7 and a corresponding presentation time of 20 in the segment file 26-4.

The packager 20-1 continues to process the encoded video stream 22 and processes the frame F8. The packager 20-1 determines that the break indicator signal 24-2 indicated that an advertisement break should occur immediately prior to frame F8. To ensure that the break begins on a segment boundary, the packager 20-1 gives the segment file 26-4 a name (e.g., "SN_2_20.M4S") that includes the timestamp value of the presentation timestamp of the first encoded frame in the segment file 26-4, in this example, the encoded frame F7, which has a presentation timestamp of 20, and closes the segment file 26-4.

The packager 20-1 generates the new segment file 26-5. The packager 20-1 stores the frame F8 in the segment file 26-5, but because the break indicator signal 24-2 indicated that an advertisement break should occur immediately prior to frame F8, the packager 20-1 changes the presentation timestamp of the frame F8 from the original presentation timestamp of 70 to 0, and stores the timestamp of 0 in the segment file 26-5. The packager 20-1 also stores information in the new segment file 26-5 indicating that the reference point in time, going forward, is the time of presentation of the frame F8. The packager 20-1 stores the original presentation timestamp of 70 of the frame F8 in a memory location. The packager 20-1 processes the encoded frame F9 and stores the encoded frame F9 in the segment file 26-5. The packager 20-1 determines that a presentation time delta between the original presentation timestamp of 80 of the frame F8 and the original presentation timestamp of 90 of the frame F9 is 10. Thus, the frame F6 should be presented 10 time increments after the presentation of the frame F9. The packager 20-1 stores a presentation time of 10 for the frame F9 in the segment file 26-5. The packager 20-1 gives the segment file 26-5 a name (e.g., "SN_3_0.M4S") that includes the timestamp value of the presentation timestamp of the first encoded frame in the segment file 26-5, in this example, the encoded frame F8 which has a presentation timestamp of 0.

The packager 20-1 iteratively continues to process the encoded video stream 22 and generate segment files in the manner described above. Note that at least for the presentation timestamps generated for the frame F5 and thereafter the presentation timestamps in the segment files 26 of the packaged encoded video stream 25 are not those generated by the encoder 16-1 with respect to a particular clock, as were the original presentation time stamps of the encoded frames F in the encoded video stream 22, but are generated relative to the timing of a break as identified by the break indicator signals 24. Thus, as will be described below in greater detail, other packagers that process encoded frames generated from the same source video stream 14 and that utilize the same SCTE based synchronization described above will generate segment files that contain identical presentation timestamps for the same encoded frames, and thus can generate segment file names that include the precise same presentation timestamp components.

Figure 2:
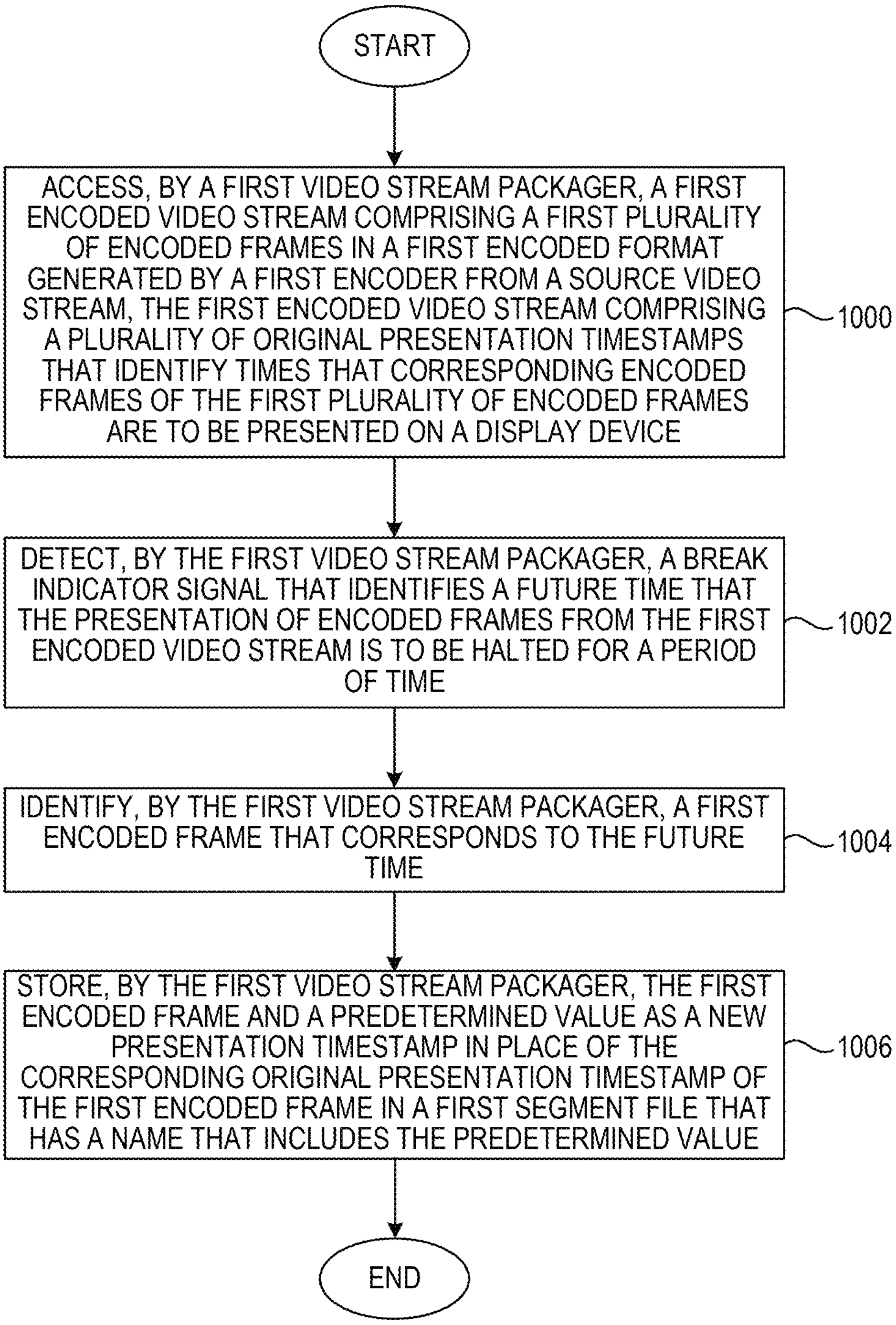
FIG. 2 is a flowchart of a method for video stream synchronization based on break indicators according to some implementations.

FIG. 2 is a flowchart of a method for video stream synchronization based on break indicators according to some implementations. FIG. 2 will be discussed in conjunction with FIG. 1. The video stream packager 20-1 accesses the encoded video stream 22 comprising the plurality of encoded frames F in an encoded format generated by the encoder 16-1 from the source video stream 14. The encoded video stream 22 comprises the plurality of original presentation timestamps TS that identify times that corresponding encoded frames F of the plurality of encoded frames F are to be presented on a display device (FIG. 2, block 1000). The video stream packager 20-1 detects the break indicator signal 24-1 that identifies a future time that the presentation of encoded frames F from the encoded video stream 22 is to be halted for a period of time (FIG. 2, block 1002). The video stream packager 20-1 identifies the encoded frame F5 that corresponds to the future time (FIG. 2, block 1004). The video stream packager 20-1 stores the encoded frame F5 and a predetermined value as a new presentation timestamp in place of the corresponding original presentation timestamp of the encoded frame F5 in the segment file 26-3 that has a name that includes the predetermined value (FIG. 2, block 1006).

Figure 3:
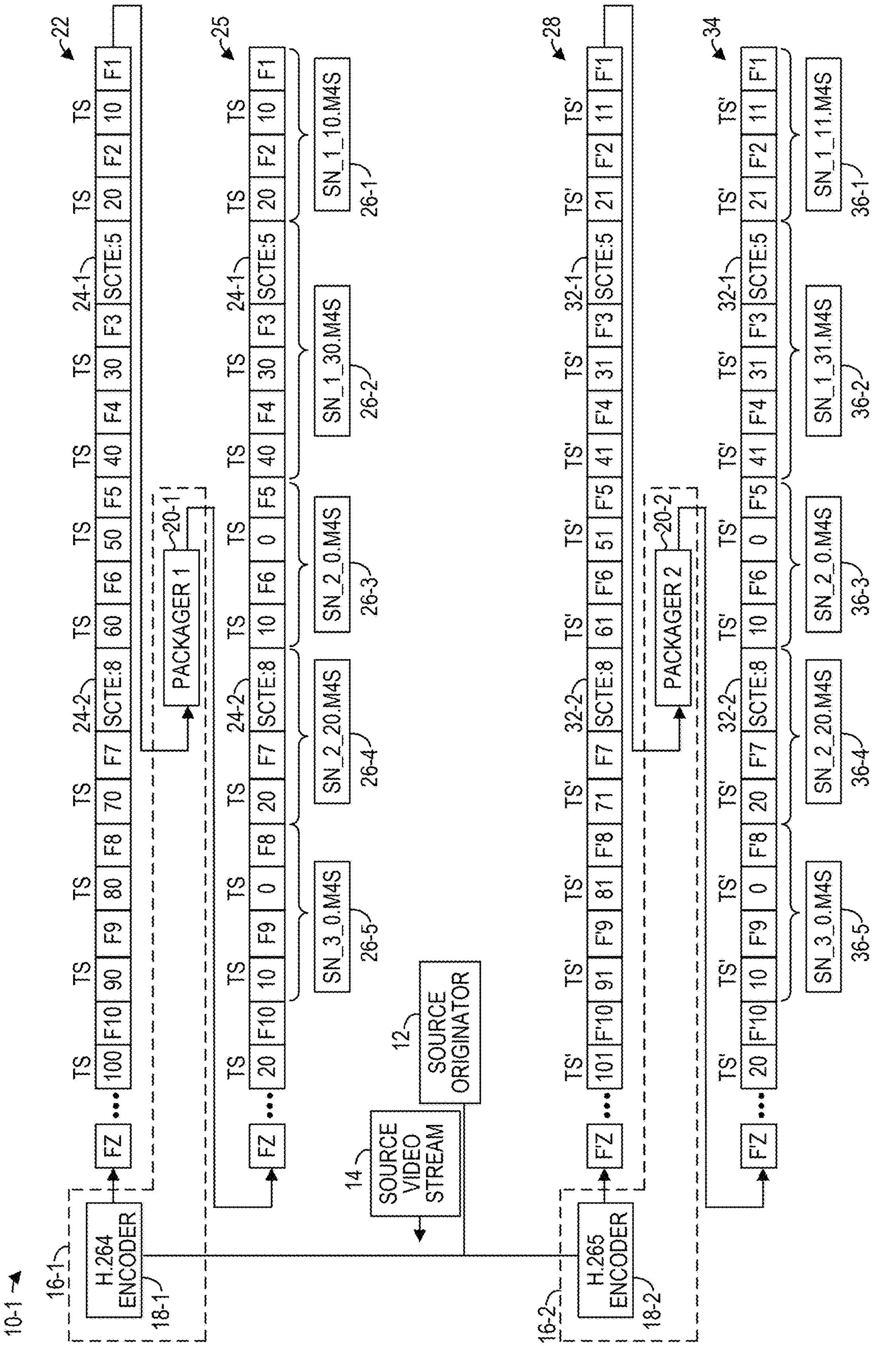
FIG. 3 is a block diagram of an environment suitable for video stream synchronization based on break indicators according to some implementations.

FIG. 3 is a block diagram of an environment 10-1 suitable for video stream synchronization based on break indicators according to additional implementations. FIG. 3 is substantially similar to FIG. 1 except as otherwise disclosed herein. In practice, a content distributor, such as an Internet service provider or the like, may generate multiple encoded packaged streams from the same source video stream 14. Some encoded packaged streams may utilize an identical encoder and be generated for backup and failover purposes, some encoded packaged streams may be generated for a particular type of device, such as a mobile device with a 5 inch screen as compared to a 65 inch television, some may be generated for different resolutions to distinguish different service offerings, such as a 4K resolution service offering and a 1080 resolution service offering. Thus, an entity may implement any number of pipelines processing a same source video.

As discussed above, the granularity of the timestamps, such as 90,000 units per second, can make it difficult, impracticable or even impossible to synchronize timestamps exactly such that the presentation timestamps associated with each encoded frame generated by each encoder that depicts the same content has the exact same timestamp. This is especially true where the encoders may execute on different computing devices and thus obtain timing information from different clocks, even if such computing devices are attempting to maintain synchronization.

FIG. 3 illustrates a second pipeline 16-2 that processes the source video stream 14 identically to the manner in which the first pipeline 16-1 processed the source video stream 14 as described above with regard to FIG. 1 to generate the encoded packaged video stream 25. While not illustrated due to spatial limitations, the pipeline 16-1 executes on a first computing device and the pipeline 16-2 executes on a second computing device. An encoder 18-2 of the second pipeline 16-2 encodes the source video stream 14 according to a different encoded format than the encoder 18-2, such as, by way of non-limiting example. an H.265 encoded format, and in accordance with a desired resolution and/or bitrate. The encoder 18-2 generates an encoded video stream 28 of a plurality of encoded frames F'1-F'Z (generally, encoded frames F') at a desired FPS rate, such as 30 or 60 FPS. For the sake of illustration, assume that the encoder 18-2 generates frames at the same FPS as the encoder 18-1. Again, the encoder 18-2 may generate hundreds of thousands, or even millions of encoded frames F' depending on the duration of the source video stream 14.

The encoder 18-2 generates a presentation timestamp for at least some of the encoded frames F'1-F'Z that identify a relative point in time that the particular encoded frame F' should be presented on a display device when being streamed to the display device. For purposes of illustration each of the encoded frames F' in the encoded video stream 28 are illustrated with a corresponding timestamp designated by the letter "TS". When presented on a display device, each frame F' depicts the same content (e.g., depicts the same scene) as the corresponding frame F in the encoded video stream 22, wherein the correspondence is the number of the frame. Thus, for example, frames F1 and F'1 depict the same content, although they may be encoded differently.

The clock used by the encoder 18-2 is not synchronized with the clock used by the encoder 18-1 and thus the presentation timestamps for the corresponding frames differ by a value of 1. For example, the frame F'1 has a corresponding presentation timestamp of 11, the frame F6 has a corresponding presentation timestamp of 61, and the frame F9 has a corresponding presentation timestamp of 91. Accordingly, when the names of segment files include the presentation timestamps of the first encoded frame in the segment file name, the segment file names generated from the encoded video stream 28, in the absence of the examples disclosed herein, would differ from the segment file names generated from the encoded video stream 22 even though the segment files will contain the exact same content. Other than the different encoding format and different timestamps, the encoder 18-2 processes the source video stream 14 substantially similarly as the encoder 18-1 and outputs a substantially similarly encoded video stream 28. Because the source video stream 14 includes the break indicators, the encoded video stream 28 also includes break indicators 32-1 and 32-2, which are at the same relative locations in the encoded video stream 28 and refer to the same corresponding frames F' as the break indicators 24-1 and 24-2.

The packager 20-2 accesses the encoded video stream 28 and generates a packaged encoded video stream 34 that comprises a plurality of segment files 36-1-36-5 (generally, segment files 36), each of which comprises one or more encoded frames F'. Similar to the encoder 20-1, solely for purposes of illustration and simplicity it will be assumed that the packager 20-2 will generally generate segment files having two encoded frames F'.

The packager 20-2 processes the encoded frame F'1 and stores the encoded frame F'1 and the presentation timestamp 11 in the segment file 36-1. The packager 20-2 may process the encoded frame F'2 and store the encoded frame F'2 and the presentation timestamp 21 in the segment file 36-1.

The packager 20-2 gives the segment file 36-1 a name (e.g., "SN_1_11.M4S") that includes the timestamp value of the presentation timestamp of the first encoded frame in the segment file 36-1, in this example, the encoded frame F'1 which has a presentation timestamp of 11. Since the segment file 36-1 contains two encoded frames, the packager 20-2 closes the segment file 36-1 and generates the new segment file 36-2. The packager 20-2 continues to process the encoded video stream 28 and identifies the break indicator signal 32-1. The packager 20-2 determines that the break indicator signal 32-1 indicates an advertisement break should occur immediately prior to frame F'5. The packager 20-2 stores the break indicator signal 32-1 in the segment file 36-2. The packager 20-2 processes the encoded frame F'3 and stores the encoded frame F'3 and the timestamp 31 in the segment file 36-2. The packager 20-2 processes the encoded frame F'4 and stores the encoded frame F'4 and the timestamp 41 in the segment file 36-2. The packager 20-2 gives the segment file 36-2 a name (e.g., "SN_1_31.M4S") that includes the timestamp value of the presentation timestamp of the first encoded frame in the segment file 36-2, in this example, the encoded frame F'3 which has a presentation timestamp of 31.

Since the segment file 36-2 contains two encoded frames, the packager 20-2 closes the segment file 36-2 and generates the new segment file 36-3. The packager 20-2 continues to process the encoded video stream 28 and processes the frame F'5. The packager 20-2 stores the frame F'5 in the segment file 36-3, but because the break indicator signal 32-2 indicated that an advertisement break should occur immediately prior to frame F'5, the packager 20-2 changes the presentation timestamp of the frame F'5 from the original presentation timestamp of 41 to the predetermined presentation timestamp value, in this example 0, and stores the presentation timestamp of 0 in the segment file 36-3. The packager 20-2 also stores information in the new segment file 36-3 indicating that the reference point in time, going forward, is the time of presentation of the frame F'5. The packager 20-2 also stores the original presentation timestamp of 50 of the frame F'5 in a memory location for subsequent use. The packager 20-2 processes the encoded frame F'6 and stores the encoded frame F'6 in the segment file 36-3. The packager 20-2 determines that a presentation time delta between the original presentation timestamp of 51 of the frame F'5 and the original presentation timestamp of 61 of the frame F'6 is 10. Thus, the frame F'6 should be presented 10 units after the presentation of the frame F'5. The packager 20-2 stores a presentation time of 10 for the frame F'6 in the segment file 36-4. The packager 20-2 gives the segment file 36-3 a name (e.g., "SN_2_0.M4S") that includes the timestamp value of the presentation timestamp of the first encoded frame in the segment file 36-3, in this example, the encoded frame F'5 which has a presentation timestamp of 0. The packager 20-2 may store the original presentation timestamp of each encoded frame F' in memory for comparison to the original presentation of the next encoded frame F' to determine the presentation time delta between each encoded frame F'. Thus, the packager 20-2 stores the original presentation time 61 of the encoded frame F'6 in a memory location.

Since the segment file 36-3 contains two encoded frames, the packager 20-2 closes the segment file 36-3 and generates the new segment file 36-4. The packager 20-2 continues to process the encoded video stream 28 and identifies the break indicator signal 32-2. The packager 20-2 determines that the break indicator signal 32-2 indicates an advertisement break should occur immediately prior to frame F'8, which thus identifies a future time that the presentation of the encoded frames F from the encoded video stream 28 is to be halted for a period of time. The packager 20-2 stores the break indicator signal 32-2 in the segment file 36-4. The packager 20-2 processes the encoded frame F'7. The packager 20-2 accesses the original presentation timestamp of the previous frame F'6 and accesses the original presentation timestamp of the frame F'7 and determines that a presentation time delta between the original presentation timestamp of 61 of the frame F'6 and the original presentation timestamp of 71 of the frame F'7 is 10. The packager 20-2 determines a new presentation timestamp of 20 for the frame F'7 based on the presentation time delta, as discussed above with regard to FIG. 1. The packager 20-2 stores the encoded frame F'7 and a corresponding presentation time of 20 in the segment file 36-4.

The packager 20-2 continues to process the encoded video stream 28 and processes the frame F'8. The packager 20-2 determines that the break indicator signal 36-2 indicated that an advertisement break should occur immediately prior to frame F'8. To ensure that the break begins on a segment boundary, the packager 20-2 gives the segment file 36-4 a name (e.g., "SN_2_20.M4S") that includes the timestamp value of the presentation timestamp of the first encoded frame in the segment file 36-4, in this example, the encoded frame F'7, which has a presentation timestamp of 20, and closes the segment file 36-4.

The packager 20-2 generates the new segment file 36-5. The packager 20-2 stores the frame F'8 in the segment file 36-5, but because the break indicator signal 32-2 indicated that an advertisement break should occur immediately prior to frame F'8, the packager 20-2 changes the presentation timestamp of the frame F'8 from the original presentation timestamp of 71 to 0, and stores the timestamp of 0 in the segment file 36-5. The packager 20-2 also stores information in the new segment file 36-5 indicating that the reference point in time, going forward, is the time of presentation of the frame F'8. The packager 20-2 stores the original presentation timestamp of 70 of the frame F'8 in a memory location. The packager 20-2 processes the encoded frame F'9 and stores the encoded frame F'9 in the segment file 36-5. The packager 20-2 determines that a presentation time delta between the original presentation timestamp of 81 of the frame F'8 and the original presentation timestamp of 91 of the frame F'9 is 10. Thus, the frame F'6 should be presented 10 units after the presentation of the frame F'9. The packager 20-2 stores a presentation time of 10 for the frame F'9 in the segment file 36-5. The packager 20-2 gives the segment file 36-5 a name (e.g., "SN_3_0.M4S") that includes the timestamp value of the presentation timestamp of the first encoded frame in the segment file 36-5, in this example, the encoded frame F'8 which has a presentation timestamp of 0.

The packager 20-2 iteratively continues to process the encoded video stream 28 and generate segment files in the manner described above. Note that the presentation times in the segment file names in the packaged encoded video stream 34 subsequent to processing the first break indicator signal 32-1 are identical to the presentation times in the segment file names in the packaged encoded video stream 25, even though the original presentation timestamps of the identical frames differed. Thus, during a failover from the packaged encoded video stream 25, the packaged encoded video stream 34 could be used, at least at a point in time subsequent to the first break, and a client device would be presented with segment file names that have the exact same presentation timestamps and contain the exact same content, resulting in a seamless failover. It is noted that, although the segment file names 36-3-36-6 are identical to the file names 26-3-26-6, this is not necessarily a requirement so long as that portion of the segment file names 26-3-26-6 and 36-3-36-6 that contain the presentation timestamps are identical.

Tables 1 and 2 illustrate another example of video stream synchronization based on break indicators.

TABLE 1

| Frame # | Original presentation timestamp | New presentation timestamp | Presentation Time Delta | SCTE Information |
|---|---|---|---|---|
| . . . | . . . | . . . | . . . | . . . |
| . . . | . . . | . . . | . . . | . . . |
| 751 | 1000 | 90 | 10 | NONE |
| 752 | 1010 | 100 | 10 | NONE |
| 753 | 1020 | 110 | 10 | Point to Frame 755 |
| 754 | 1030 | 120 | 10 | NONE |
| 755 | 1040 | 0 | | NONE |
| 756 | 1050 | 10 | 10 | NONE |
| 757 | 1060 | 20 | 10 | NONE |
| 758 | 1070 | 30 | 10 | NONE |
| 759 | 1080 | 40 | 10 | Pointing to Frame 762 |

TABLE 1-continued

| Frame # | Original presentation timestamp | New presentation timestamp | Presentation Time Delta | SCTE Information |
|---|---|---|---|---|
| 760 | 1090 | 50 | 10 | NONE |
| 761 | 1100 | 60 | 10 | NONE |
| 762 | 1110 | 0 | | NONE |
| 763 | 1120 | 10 | 10 | NONE |
| 764 | 1130 | 20 | 10 | NONE |
| 765 | 1140 | 30 | 10 | NONE |

In this example, a live source video stream is being processed by a first pipeline as illustrated in Table 1. The encoder of the first pipeline is generating frames, as illustrated in the leftmost column and the video stream packager is generating new presentation timestamps and segments in accordance with the SCTE 35 signals based on the original presentation timestamps and the presentation time delta as described above.

TABLE 2

| Frame # | Original presentation timestamp | New presentation timestamp | Presentation Time Delta | SCTE Information |
|---|---|---|---|---|
| . . . | . . . | . . . | . . . | . . . |
| . . . | . . . | . . . | . . . | . . . |
| 121 | 564 | 90 | 10 | NONE |
| 122 | 574 | 100 | 10 | NONE |
| 123 | 584 | 110 | 10 | Point to Frame 125 |
| 124 | 594 | 120 | 10 | NONE |
| 125 | 604 | 0 | | NONE |
| 126 | 614 | 10 | 10 | NONE |
| 127 | 624 | 20 | 10 | NONE |
| 128 | 634 | 30 | 10 | NONE |
| 129 | 644 | 40 | 10 | Pointing to Frame 132 |
| 130 | 654 | 50 | 10 | NONE |
| 131 | 664 | 60 | 10 | NONE |
| 132 | 674 | 0 | | NONE |
| 133 | 684 | 10 | 10 | NONE |
| 134 | 694 | 20 | 10 | NONE |
| 135 | 704 | 30 | 10 | NONE |

A second pipeline begins processing the source video stream at a later point in time than the source video stream began processing the source video stream and generates frames as illustrated in Table 2, and thus the frame numbers are no longer identical. However, the content of the frames 121-135 is identical to the content of the frames 751-765 of Table 1.

Thus:

Content for Table_1_Frame #751=Content for Table_2_Frame #121

Content for Table_1_Frame #752=Content for Table_2_Frame #122

Content for Table_1_Frame #753=Content for Table_2_Frame #123

Content for Table_1_Frame #754=Content for Table_2_Frame #124

. . .

. . .

Content for Table_1_Frame #764=Content for Table_2_Frame #134

Content for Table_1_Frame #765=Content for Table_2_Frame #135

As illustrated in Table 1 an SCTE signal arrives when the first pipeline is processing frame 753 and the SCTE signal refers to frame 755. When frame 755 is processed by the package, the packager resets the presentation timestamp to 0. When frame 756 is processed, the new presentation timestamp is determined by the following formula: new presentation timestamp=previous new presentation timestamp+presentation time delta, and presentation time delta=original presentation timestamp of current frame-original presentation timestamp of previous frame.

Thus, for frame 756, presentation time delta=1050−1040=10, and new presentation timestamp=0+10=10.

Similarly for frame 757, presentation time delta=1060−1050=10, and new presentation timestamp=10+10=20.

Referring to Table 2, the packager receives an SCTE signal in frame 123 referring to frame 125. When frame 125 is processed, the video stream packager resets the presentation timestamp to 0. When frame 126 is processed, presentation time delta=614−604=10, and new presentation timestamp=0+10=10. For frame 127, presentation time delta=624−614=10, and new presentation timestamp=10+10=20. With the prior knowledge that the frames 121-135 are identical to the content of the frames 751-765, the new presentation timestamps of each of the frames 121-135 and corresponding frames 751-765 are identical. Thus, frame synchronization has been achieved without the need for an external timing source or communications between the two pipelines.

Figure 4:
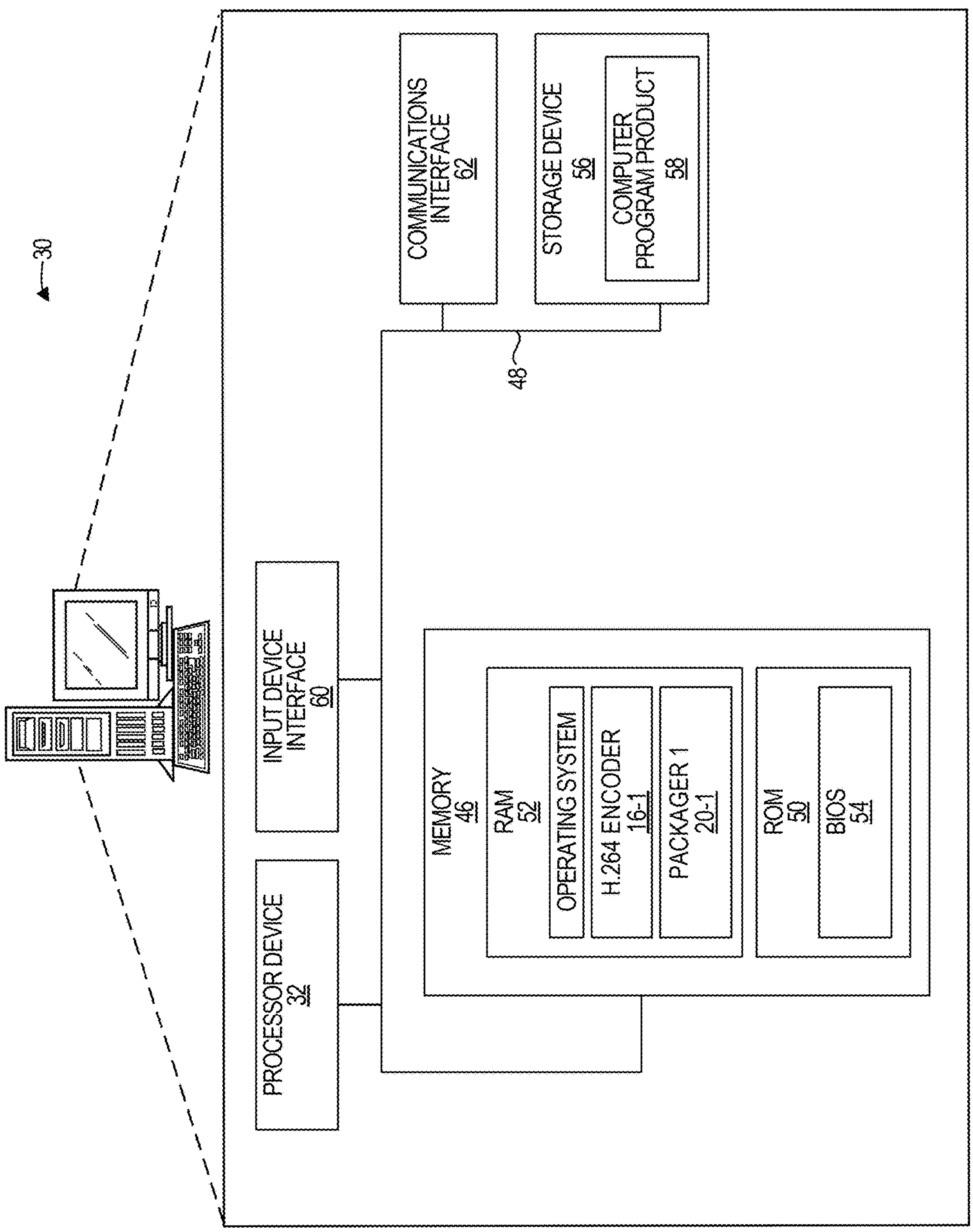
FIG. 4 is a block diagram of a computing system suitable for implementing examples disclosed herein.

FIG. 4 is a block diagram of a computing system 40 suitable for implementing examples disclosed herein. The computing system 40 includes one or more computing devices 42. Each pipeline may execute on a different computing device 42 or a single computing device 42 may execute multiple pipelines. The representative computing device 42 illustrated in FIG. 4 may comprise any computing or electronic device capable of including firmware, hardware, and/or executing software instructions to implement the functionality described herein, such as a computer server, a desktop computing device, a specialized video processing device, or the like. The computing device 42 includes a processor device 44, a system memory 46, and a system bus 48. The system bus 48 provides an interface for system components including, but not limited to, the system memory 46 and the processor device 44. The processor device 44 can be any commercially available or proprietary processor.

The system bus 48 may be any of several types of bus structures that may further interconnect to a memory bus (with or without a memory controller), a peripheral bus, and/or a local bus using any of a variety of commercially available bus architectures. The system memory 46 may include non-volatile memory 50 (e.g., read-only memory (ROM), erasable programmable read-only memory (EPROM), electrically erasable programmable read-only memory (EEPROM), etc.), and volatile memory 52 (e.g., random-access memory (RAM)). A basic input/output system (BIOS) 54 may be stored in the non-volatile memory 50 and can include the basic routines that help to transfer information between elements within the computing device 42. The volatile memory 52 may also include a high-speed RAM, such as static RAM, for caching data.

The computing device 42 may further include or be coupled to a non-transitory computer-readable storage medium such as a storage device 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 56 and other drives associated with computer-readable media and computer-usable media may provide non-volatile storage of data, data structures, computer-executable instructions, and the like.

A number of modules can be stored in the storage device 56 and in the volatile memory 52, including an operating system and one or more program modules, such as the encoder 16-1 and the packager 20-1, which may implement the functionality described herein in whole or in part. All or a portion of the examples may be implemented as a computer program product 58 stored on a transitory or non-transitory computer-usable or computer-readable storage medium, such as the storage device 56, which includes complex programming instructions, such as complex computer-readable program code, to cause the processor device 44 to carry out the steps described herein. Thus, the computer-readable program code can comprise software instructions for implementing the functionality of the examples described herein when executed on the processor device 44.

An operator may also be able to enter one or more configuration commands through a keyboard (not illustrated), a pointing device such as a mouse (not illustrated), or a touch-sensitive surface such as a display device. Such input devices may be connected to the processor device 44 through an input device interface 60 that is coupled to the system bus 48 but can be connected by other interfaces such as a parallel port, an Institute of Electrical and Electronic Engineers (IEEE) 1394 serial port, a Universal Serial Bus (USB) port, an IR interface, and the like. The computing device 42 may also include a communications interface 62, such as an Ethernet transceiver and/or a Wi-Fi transceiver, or the like, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

accessing, by a first video stream packager, a first encoded video stream comprising a first plurality of encoded frames in a first encoded format generated by a first encoder from a source video stream, the first encoded video stream comprising a plurality of original presentation timestamps that identify times that corresponding encoded frames of the first plurality of encoded frames are to be presented on a display device;

detecting, by the first video stream packager, a break indicator signal that identifies a future time that the presentation of encoded frames from the first encoded video stream is to be halted for a period of time;

identifying, by the first video stream packager, a first encoded frame that corresponds to the future time; and storing, by the first video stream packager, the first encoded frame and a predetermined value as a new presentation timestamp in place of the corresponding original presentation timestamp of the first encoded frame in a first segment file that has a name that includes the predetermined value.

2. The method of claim 1, wherein the break indicator signal comprises an Society of Cable Telecommunications Engineers (SCTE) 35 splice insert signal.

3. The method of claim 1, wherein the predetermined value comprises a value of zero.

4. The method of claim 1, further comprising:

accessing, by a second video stream packager, a second encoded video stream comprising a second plurality of encoded frames in a second encoded format generated by a second encoder from the source video stream, the second encoded video stream comprising a plurality of original presentation timestamps that identify times that corresponding encoded frames of the second plurality of encoded frames are to be presented on a display device;

detecting, by the second video stream packager, the break indicator signal that identifies the future time that the presentation of encoded frames from the second encoded video stream is to be halted for the period of time;

identifying, by the second video stream packager, a second encoded frame that corresponds to the future time; and storing, by the second video stream packager, the second encoded frame and the predetermined value as a new presentation timestamp in place of the corresponding original presentation timestamp of the second encoded frame in a second segment file that has a name that includes the predetermined value.

5. The method of claim 4, wherein the original presentation timestamp that corresponds to the second encoded frame in the second encoded video stream differs from the original presentation timestamp that corresponds to the first encoded frame in the second encoded video stream, and the second encoded frame in the second encoded video stream depicts identical content as the first encoded frame in the first encoded video stream.

6. The method of claim 1, wherein the first encoder executes on a first computing device and the second encoder executes on a second computing device.

7. The method of claim 1, further comprising:

storing, by the first video stream packager, the original presentation timestamp that corresponds to the first encoded frame in a memory;

subsequent to storing the first encoded frame in the first segment file, accessing, by the first video stream packager, a second encoded frame that is to be presented immediately after the first encoded frame is to be presented;

determining, by the first video stream packager, a presentation time delta between the original presentation timestamp that corresponds to the first encoded frame and the original presentation timestamp that corresponds to the second encoded frame; and changing, by the first video stream packager, the original presentation timestamp that corresponds to the second encoded frame to the sum of the presentation time delta and the new presentation timestamp that corresponds to the first encoded frame.

8. A computer system, comprising:

one or more computing devices operable to:

access, by a first video stream packager executing on one of the one or more computing devices, a first encoded video stream comprising a first plurality of encoded frames in a first encoded format generated by a first encoder from a source video stream, the first encoded video stream comprising a plurality of original presentation timestamps that identify times that corresponding encoded frames of the first plurality of encoded frames are to be presented on a display device;

detect, by the first video stream packager, a break indicator signal that identifies a future time that the presentation of encoded frames from the first encoded video stream is to be halted for a period of time;

identify, by the first video stream packager, a first encoded frame that corresponds to the future time; and store, by the first video stream packager, the first encoded frame and a predetermined value as a new presentation timestamp in place of the corresponding original presentation timestamp of the first encoded frame in a first segment file that has a name that includes the predetermined value.

9. The computer system of claim 8, wherein the break indicator signal comprises an Society of Cable Telecommunications Engineers (SCTE) 35 splice insert signal.

10. The computer system of claim 8, wherein the predetermined value comprises a value of zero.

11. The computer system of claim 8, wherein the one or more computing devices are further operable to:

access, by a second video stream packager executing on one of the one or more computing device, a second encoded video stream comprising a second plurality of encoded frames in a second encoded format generated by a second encoder from the source video stream, the second encoded video stream comprising a plurality of original presentation timestamps that identify times that corresponding encoded frames of the second plurality of encoded frames are to be presented on a display device;

detect, by the second video stream packager, the break indicator signal that identifies the future time that the presentation of encoded frames from the second encoded video stream is to be halted for the period of time;

identify, by the second video stream packager, a second encoded frame that corresponds to the future time; and store, by the second video stream packager, the second encoded frame and the predetermined value as a new presentation timestamp in place of the corresponding original presentation timestamp of the second encoded frame in a second segment file that has a name that includes the predetermined value.

12. The computer system of claim 11, wherein the original presentation timestamp that corresponds to the second encoded frame in the second encoded video stream differs from the original presentation timestamp that corresponds to the first encoded frame in the second encoded video stream, and the second encoded frame in the second encoded video stream depicts identical content as the first encoded frame in the first encoded video stream.

13. The computer system of claim 8, wherein the first encoder executes on a first computing device of the one or more computing devices and the second encoder executes on a second computing device of the one or more computing devices.

14. The computer system of claim 8, wherein the one or more computing devices are further operable to:

store, by the first video stream packager, the original presentation timestamp that corresponds to the first encoded frame in a memory;

subsequent to storing the first encoded frame in the first segment file, access, by the first video stream packager, a second encoded frame that is to be presented immediately after the first encoded frame is to be presented;

determine, by the first video stream packager, a presentation time delta between the original presentation timestamp that corresponds to the first encoded frame and the original presentation timestamp that corresponds to the second encoded frame; and change, by the first video stream packager, the original presentation timestamp that corresponds to the second encoded frame to the sum of the presentation time delta and the new presentation timestamp that corresponds to the first encoded frame.

15. A non-transitory computer-readable storage medium that includes executable instructions operable to cause one or more computing devices to:

access, by a first video stream packager executing on one of the one or more computing devices, a first encoded video stream comprising a first plurality of encoded frames in a first encoded format generated by a first encoder from a source video stream, the first encoded video stream comprising a plurality of original presentation timestamps that identify times that corresponding encoded frames of the first plurality of encoded frames are to be presented on a display device;

detect, by the first video stream packager, a break indicator signal that identifies a future time that the presentation of encoded frames from the first encoded video stream is to be halted for a period of time;

identify, by the first video stream packager, a first encoded frame that corresponds to the future time; and store, by the first video stream packager, the first encoded frame and a predetermined value as a new presentation timestamp in place of the corresponding original presentation timestamp of the first encoded frame in a first segment file that has a name that includes the predetermined value.

16. The non-transitory computer-readable storage medium of claim 15, wherein the instructions are further operable to cause the one or more computing devices are further operable to:

access, by a second video stream packager executing on one of the one or more computing device, a second encoded video stream comprising a second plurality of encoded frames in a second encoded format generated by a second encoder from the source video stream, the second encoded video stream comprising a plurality of original presentation timestamps that identify times that corresponding encoded frames of the second plurality of encoded frames are to be presented on a display device;

detect, by the second video stream packager, the break indicator signal that identifies the future time that the presentation of encoded frames from the second encoded video stream is to be halted for the period of time;

identify, by the second video stream packager, a second encoded frame that corresponds to the future time; and store, by the second video stream packager, the second encoded frame and the predetermined value as a new presentation timestamp in place of the corresponding original presentation timestamp of the second encoded frame in a second segment file that has a name that includes the predetermined value.

17. The non-transitory computer-readable storage medium of claim 16, wherein the original presentation timestamp that corresponds to the second encoded frame in the second encoded video stream differs from the original presentation timestamp that corresponds to the first encoded frame in the second encoded video stream, and the second encoded frame in the second encoded video stream depicts identical content as the first encoded frame in the first encoded video stream.

18. The non-transitory computer-readable storage medium of claim 16, wherein the first encoder executes on a first computing device of the one or more computing devices and the second encoder executes on a second computing device of the one or more computing devices.

19. The non-transitory computer-readable storage medium of claim 15, wherein the instructions are further operable to cause the one or more computing devices are further operable to:

store, by the first video stream packager, the original presentation timestamp that corresponds to the first encoded frame in a memory;

subsequent to storing the first encoded frame in the first segment file, access, by the first video stream packager, a second encoded frame that is to be presented immediately after the first encoded frame is to be presented;

determine, by the first video stream packager, a presentation time delta between the original presentation timestamp that corresponds to the first encoded frame and the original presentation timestamp that corresponds to the second encoded frame; and change, by the first video stream packager, the original presentation timestamp that corresponds to the second encoded frame to the sum of the presentation time delta and the new presentation timestamp that corresponds to the first encoded frame.

20. The non-transitory computer-readable storage medium of claim 15, wherein the predetermined value comprises a value of zero.

* * * * *